US011159969B2

(12) United States Patent
Love et al.

(10) Patent No.: US 11,159,969 B2
(45) Date of Patent: Oct. 26, 2021

(54) INTERFERENCE CONTROL, SINR OPTIMIZATION AND SIGNALING ENHANCEMENTS TO IMPROVE THE PERFORMANCE OF OTDOA MEASUREMENTS

(71) Applicant: Google Technology Holdings LLC, Mountain View, CA (US)

(72) Inventors: Robert T. Love, Barrington, IL (US); Ajit Nimbalker, Arlington Heights, IL (US); Kenneth A. Stewart, Sunnyvale, CA (US); Sandeep H. Krishnamurthy, Mountain View, CA (US); Xiangyang Zhuang, Lake Zurich, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 739 days.

(21) Appl. No.: 14/673,391

(22) Filed: Mar. 30, 2015

(65) Prior Publication Data
US 2015/0208271 A1 Jul. 23, 2015

Related U.S. Application Data

(62) Division of application No. 12/813,221, filed on Jun. 10, 2010, now Pat. No. 9,002,354.

(Continued)

(51) Int. Cl.
*H04W 24/10* (2009.01)
*G01S 5/02* (2010.01)
(Continued)

(52) U.S. Cl.
CPC .............. *H04W 24/10* (2013.01); *G01S 1/30* (2013.01); *G01S 5/0236* (2013.01); *G01S 5/10* (2013.01);
(Continued)

(58) Field of Classification Search
None
See application file for complete search history.

(56) References Cited

U.S. PATENT DOCUMENTS

| 4,631,543 | A | 12/1986 | Brodeur |
| 7,155,244 | B2 * | 12/2006 | Edge .................. H04W 56/002 |
| | | | 455/502 |

(Continued)

FOREIGN PATENT DOCUMENTS

| CN | 1762137 A | 4/2006 |
| CN | 1859656 A | 11/2006 |

(Continued)

OTHER PUBLICATIONS

IEEE 802.16 Broadband Wireless Access Working Group "IEEE 802.16m System Description Document [Draft]" Nokia, Submitted Feb. 7, 2009, 171 pages.

(Continued)

*Primary Examiner* — Donald L Mills
(74) *Attorney, Agent, or Firm* — Marshall, Gerstein & Borun LLP

(57) ABSTRACT

A wireless terminal receives signaling information, pertaining to a reference signal transmission in at least one specifically designated sub frame, the signaling information including a list, the list including base station identities. The terminal determines, from at least one of the base station identities in the list, the time-frequency resources associated with a reference signal transmission intended for observed time difference of arrival (OTDOA) measurements from a transmitting base station associated with said one base station identity. The time of arrival of a transmission from the transmitting base station, relative to reference timing, is measured. The wireless terminal can receive a command from a serving cell to start performing inter-frequency OTDOA measurement on a frequency layer containing (Continued)

reference signals, the frequency layer distinct from the serving frequency layer, the serving frequency layer not containing positioning reference signals. The wireless terminal can perform OTDOA measurements subsequent to the reception of the command on a carrier frequency different from the serving cell carrier frequency. A base station transmitter can jointly schedule a reference signal transmission from a plurality of base station transmitters for the purpose of OTD estimation enhancement, and transmit identical reference signals from the plurality of base station transmitters, the reference signals being identical both in the signal sequence and time-frequency resources used for transmission.

8 Claims, 6 Drawing Sheets

Related U.S. Application Data

(60) Provisional application No. 61/186,568, filed on Jun. 12, 2009.

(51) Int. Cl.
| | |
|---|---|
| *G01S 5/10* | (2006.01) |
| *H04L 5/00* | (2006.01) |
| *H04W 64/00* | (2009.01) |
| *G01S 1/30* | (2006.01) |
| *H04L 12/26* | (2006.01) |
| *H04W 72/04* | (2009.01) |
| *H04L 27/26* | (2006.01) |

(52) U.S. Cl.
CPC ............ *H04L 5/005* (2013.01); *H04L 5/0094* (2013.01); *H04L 43/0852* (2013.01); *H04W 64/00* (2013.01); *H04W 72/044* (2013.01); *H04L 27/2656* (2013.01); *Y02D 30/00* (2018.01)

(56) References Cited

U.S. PATENT DOCUMENTS

| | | |
|---|---|---|
| 7,599,420 B2 | 10/2009 | Forenza et al. |
| 7,639,660 B2 | 12/2009 | Kim et al. |
| 7,649,831 B2 | 1/2010 | Van Rensburg et al. |
| 7,822,140 B2 | 10/2010 | Catreux et al. |
| 7,885,211 B2 | 2/2011 | Shen et al. |
| 7,940,740 B2 | 5/2011 | Krishnamurthy et al. |
| 8,284,849 B2 | 10/2012 | Lee et al. |
| 8,908,586 B2 * | 12/2014 | Gerstenberger .... H04W 36/385 370/312 |
| 9,002,354 B2 * | 4/2015 | Krishnamurthy ......... G01S 1/30 455/435.1 |
| 2001/0034238 A1 | 10/2001 | Voyer |
| 2003/0143961 A1 | 7/2003 | Humphreys et al. |
| 2003/0222819 A1 | 12/2003 | Karr et al. |
| 2004/0063439 A1 | 4/2004 | Glazko et al. |
| 2004/0192398 A1 | 9/2004 | Zhu |
| 2005/0124393 A1 | 6/2005 | Nuovo et al. |
| 2005/0134456 A1 | 6/2005 | Niu et al. |
| 2005/0135324 A1 | 6/2005 | Kim et al. |
| 2005/0250532 A1 | 11/2005 | Hwang et al. |
| 2006/0019677 A1 | 1/2006 | Teague et al. |
| 2006/0181453 A1 | 8/2006 | King et al. |
| 2006/0209754 A1 | 9/2006 | Ji et al. |
| 2006/0215618 A1 | 9/2006 | Soliman et al. |
| 2006/0256887 A1 | 11/2006 | Kwon et al. |
| 2006/0291393 A1 | 12/2006 | Teague et al. |
| 2006/0292990 A1 | 12/2006 | Karabinis et al. |
| 2007/0008108 A1 | 1/2007 | Schurig et al. |
| 2007/0049280 A1 | 3/2007 | Sambhwani et al. |
| 2007/0093281 A1 | 4/2007 | Park et al. |
| 2007/0133462 A1 | 6/2007 | Guey |
| 2007/0153743 A1 | 7/2007 | Mukkavilli et al. |
| 2007/0211657 A1 | 9/2007 | McBeath et al. |
| 2007/0211813 A1 | 9/2007 | Talwar et al. |
| 2007/0223422 A1 | 9/2007 | Kim et al. |
| 2007/0232370 A1 | 10/2007 | Kim |
| 2007/0280160 A1 | 12/2007 | Kim et al. |
| 2008/0001915 A1 | 1/2008 | Pihlaja et al. |
| 2008/0002735 A1 | 1/2008 | Poirier et al. |
| 2008/0014960 A1 | 1/2008 | Chou |
| 2008/0080449 A1 | 4/2008 | Huang et al. |
| 2008/0088931 A1 | 4/2008 | Malladi |
| 2008/0095109 A1 | 4/2008 | Malladi et al. |
| 2008/0130626 A1 | 6/2008 | Ventola et al. |
| 2008/0132247 A1 | 6/2008 | Anderson |
| 2008/0133462 A1 | 6/2008 | Aylward et al. |
| 2008/0159239 A1 | 7/2008 | Odlyzko et al. |
| 2008/0165876 A1 | 7/2008 | Suh et al. |
| 2008/0167040 A1 | 7/2008 | Khandekar et al. |
| 2008/0170602 A1 | 7/2008 | Guey |
| 2008/0170608 A1 | 7/2008 | Guey |
| 2008/0212520 A1 | 9/2008 | Chen et al. |
| 2008/0227481 A1 | 9/2008 | Naguib et al. |
| 2008/0232395 A1 | 9/2008 | Buckley et al. |
| 2008/0267310 A1 | 10/2008 | Khan et al. |
| 2008/0274753 A1 | 11/2008 | Attar et al. |
| 2008/0298482 A1 | 12/2008 | Rensburg et al. |
| 2008/0307427 A1 | 12/2008 | Pi et al. |
| 2009/0041151 A1 | 2/2009 | Khan et al. |
| 2009/0061887 A1 | 3/2009 | Hart et al. |
| 2009/0067382 A1 | 3/2009 | Li et al. |
| 2009/0122758 A1 | 5/2009 | Smith et al. |
| 2009/0122884 A1 | 5/2009 | Vook et al. |
| 2009/0228598 A1 | 9/2009 | Stamoulis et al. |
| 2009/0238131 A1 | 9/2009 | Montojo et al. |
| 2009/0252077 A1 | 10/2009 | Khandekar et al. |
| 2009/0262699 A1 | 10/2009 | Wengerter et al. |
| 2009/0268675 A1 | 10/2009 | Choi |
| 2009/0268680 A1 * | 10/2009 | Nam ..................... H04L 5/0092 370/329 |
| 2009/0270103 A1 | 10/2009 | Pani et al. |
| 2009/0285321 A1 | 11/2009 | Schulz et al. |
| 2009/0290544 A1 | 11/2009 | Yano et al. |
| 2010/0023898 A1 | 1/2010 | Nomura et al. |
| 2010/0034312 A1 | 2/2010 | Muharemovic et al. |
| 2010/0035627 A1 | 2/2010 | Hou et al. |
| 2010/0046460 A1 | 2/2010 | Kwak et al. |
| 2010/0046650 A1 | 2/2010 | Jongren et al. |
| 2010/0056166 A1 | 3/2010 | Tenny |
| 2010/0103949 A1 | 4/2010 | Jung et al. |
| 2010/0118706 A1 | 5/2010 | Parkvall et al. |
| 2010/0118839 A1 | 5/2010 | Malladi et al. |
| 2010/0157924 A1 | 6/2010 | Prasad et al. |
| 2010/0165882 A1 | 7/2010 | Palanki et al. |
| 2010/0167743 A1 | 7/2010 | Palanki et al. |
| 2010/0172310 A1 | 7/2010 | Cheng et al. |
| 2010/0172311 A1 | 7/2010 | Agrawal et al. |
| 2010/0182903 A1 | 7/2010 | Palanki et al. |
| 2010/0195566 A1 * | 8/2010 | Krishnamurthy ..... H04L 5/0007 370/328 |
| 2010/0208838 A1 | 8/2010 | Lee et al. |
| 2010/0220801 A1 | 9/2010 | Lee et al. |
| 2010/0260154 A1 * | 10/2010 | Frank ........................ G01S 5/10 370/336 |
| 2010/0272094 A1 | 10/2010 | Byard et al. |
| 2010/0273506 A1 * | 10/2010 | Stern-Berkowitz .......................... G01S 5/0009 455/456.1 |
| 2010/0311437 A1 | 12/2010 | Palanki et al. |
| 2010/0322176 A1 | 12/2010 | Chen et al. |
| 2010/0323718 A1 | 12/2010 | Jen |
| 2011/0039583 A1 * | 2/2011 | Frank ...................... G01S 5/0226 455/456.5 |
| 2011/0051834 A1 | 3/2011 | Lee et al. |
| 2011/0080969 A1 | 4/2011 | Jongren et al. |
| 2011/0116436 A1 | 5/2011 | Bachu et al. |
| 2011/0117925 A1 * | 5/2011 | Sampath ............... H04W 64/00 455/456.1 |

(56) References Cited

U.S. PATENT DOCUMENTS

| | | | |
|---|---|---|---|
| 2011/0148700 A1 | 6/2011 | Lasagabaster et al. | |
| 2011/0149868 A1 | 6/2011 | Krishnamurthy et al. | |
| 2011/0149887 A1* | 6/2011 | Khandekar | G01S 5/0081 370/329 |
| 2011/0149903 A1 | 6/2011 | Krishnamurthy et al. | |
| 2011/0158200 A1* | 6/2011 | Bachu | H04L 5/0007 370/330 |
| 2011/0190016 A1 | 8/2011 | Hamabe et al. | |
| 2011/0216840 A1 | 9/2011 | Lee et al. | |
| 2011/0244884 A1 | 10/2011 | Kangas et al. | |
| 2011/0268101 A1 | 11/2011 | Wang et al. | |
| 2012/0002609 A1 | 1/2012 | Larsson et al. | |
| 2012/0021769 A1 | 1/2012 | Lindoff et al. | |
| 2012/0033615 A1* | 2/2012 | Dai | H04L 5/0044 370/328 |
| 2012/0122478 A1 | 5/2012 | Siomina et al. | |
| 2013/0150092 A1 | 6/2013 | Frank et al. | |
| 2015/0139061 A1* | 5/2015 | Gerstenberger | H04W 36/385 370/312 |

FOREIGN PATENT DOCUMENTS

| | | |
|---|---|---|
| CN | 1984476 A | 6/2007 |
| CN | 101035379 A | 9/2007 |
| EA | 9927 B1 | 4/2008 |
| EP | 1443791 B1 | 1/2004 |
| EP | 1753152 A1 | 2/2007 |
| KR | 10-2005-0058333 A | 6/2005 |
| RU | 2005113251 A | 1/2006 |
| WO | 1999050968 A1 | 10/1999 |
| WO | 2003007508 A1 | 1/2001 |
| WO | 2004021634 A1 | 3/2004 |
| WO | 20040084447 A2 | 9/2004 |
| WO | 2006039434 A1 | 4/2006 |
| WO | 2007080727 A1 | 7/2007 |
| WO | 2007052115 A2 | 10/2007 |
| WO | 2008033117 A1 | 3/2008 |
| WO | 2008085107 A2 | 7/2008 |
| WO | 2008113210 A1 | 9/2008 |
| WO | 2008137354 A1 | 11/2008 |
| WO | 2008137607 A2 | 11/2008 |
| WO | 2010080845 A2 | 7/2010 |
| WO | 2010138039 A1 | 12/2010 |

OTHER PUBLICATIONS

Patent Cooperation Treaty, "PCT Invitation to Pay Additional Fees and, Where Applicable, Protest Fee" for International Application No. PCT/US2010/038257 dated Oct. 1, 2010, 9 pages.
Patent Cooperation Treaty, "PCT Search Report and Written Opinion of the International Searching Authority" for International Application No. PCT/US2010/030516 dated Oct. 8, 2010, 24 pages.
Syed Ali Jafar, Andrea Goldsmith; "On Optimality of Beamforming for Multiple Antenna Systems with Imperfect Feedback" Department of Electrical Engineering, Stanford University, CA, USA; 7 pages.
USPTO Notice of Allowance for U.S. Appl. No. 12/365,166 dated Apr. 16, 2010, 11 pages.
USPTO Notice of Allowance for U.S. Appl. No. 12/365,166 dated Aug. 25, 2010, 9 pages.
U.S. Appl. No. 29/329,026, filed Dec. 8, 2008 in the name of Michiel S. Knoppert, et al., entitled "Communication Device" Knoppert, et al. Design Application.
U.S. Appl. No. 29/329,028, filed Dec. 8, 2008 in the name of Michiel S. Knoppert, et al., entitled "Communication Device" Knoppert, et al. Design Application.
USPTO Patent Application Titled "A Wireless Terminal and Method for Managing the Receipt of Position Reference Signals for Use in Determining a Location" U.S. Appl. No. 12/492,339, filed Jun. 26, 2009.

3GPP TSG RAN WG1 #59, Nov. 9-13, 2009, Jeju, South Korea, "Text proposal on Orthonogonal PRS transmissions in mixed CP deployments using MBSFN subframes" Motorola, R1-095003; 4 pages.
United States Patent and Trademark Office, "Notice of Allowance and Fee(s) Due" for U.S. Appl. No. 13/040,090 dated Mar. 8, 2012, 6 pages.
Patent Cooperation Treaty, "PTO Search Report and Written Opinion of the International Searching Authority" for International Application No. PCT/US2011/044103 dated Oct. 24, 2011, 13 pages.
3GPP TSG RAN VVG1 #59bis, Jan. 18-22, 2009, Jeju, Valencia, Spain, Change Request "Clarification of the CP length of empty OFDM symbols in PRS subframes" Ericsson, ST-Ericsson, Motorola, Qualcomm Inc, R1-100311; 2 pages.
United States Patent and Trademark Office, "Non-Final Rejection" for U.S. Appl. No. 12/542,374 dated Dec. 23, 2011, 2 pages.
United States Patent and Trademark Office, "Non-Final Rejection" for U.S. Appl. No. 12/573,456 dated Nov. 18, 2011, 10 pages.
United States Patent and Trademark Office, "Final Rejection" for U.S. Appl. No. 12/573,456 dated Mar. 12, 2012, 14 pages.
Patent Cooperation Treaty, "Pot Search Report and Written Opinion of the international Searching Authority" for International Application No. PCI/US2011/045209 dated Oct. 28, 2011, 12 pages.
3GPP TSG RAN WG1 #61bis, R1-103970, "Feedback Codebook Design and Performance Evaluation" LG Electronics, Dresden, Germany, Jun. 28-Jul. 2, 2010, 6 pages.
3GPP TSG RAN WG1 #61bis, R1-103804, "Double codebook design principles" Nokia, Nokia Siemens Networks, Dresden, Germany, Jun. 28-Jul. 2, 2010, 9 pages.
3GPP TSG RAN WG1 #61, R1-103026, "View on the feedback framework for Rel. 10" Samsung, Montreal, Canada, May 10-14, 2010, 15 pages.
3GPP TSG RAN WG1 #60, R1-101219, "Views on Codebook Design for Downlink 8Tx MIMO" NTT DOCOMO, San Francisco, USA, Feb. 22-26, 2010, 9 pages.
3GPP TSG RAN WG1 #60 R1-102904 "Two-Level Codebook design for MU MIMO enhancement"ZTE, Montreal, Canada, May 10-14, 2010, 8 pages.
3GPP TSG RAN WG1 #60, R1-101129, "On Extensions to Rel-8 PMI Feedback" Motorola, San Francisco, USA, Feb. 22-26, 2010, 4 pages.
United States Patent and Trademark Office, "Non-Final Rejection" for U.S. Appl. No. 12/823,178 dated Aug. 23, 2012, 16 pages.
United States Patent and Trademark Office, "Final Rejection" for U.S. Appl. No. 12/407,783 dated Feb. 15, 2012, 19 pages.
3GPP TSG RAN1 #61, R1-103328, "Two Component Feedback Design and Codebooks" Motorola, Montreal, Canada, May 10-14, 2010, 8 pages.
United States Patent and Trademark Office, "Non-Final Rejection" for U.S. Appl. No. 12/542,374 dated Aug. 31, 2012, 28 pages.
Korean Intellectual Property Office, Notice of Preliminary Rejection for Patent Application No. 10-2011-7021719 dated Oct. 9, 2012, 10 pages.
3GPP TSG WG1 #55bis, R1-090328 "Some Results on DL-MIMO Enhancements for LTE-A" Motorola; Ljubjana, Slovenia; Jan. 12-16, 2009, 5 pages.
Japanese Patent Office; Office Action for Japanese Patent Application No. 2012-503786 dated Apr. 2, 2013, 6 pages.
3GPF TSG RAN1 #56bis R1-091336 "Study on hearabilty of reference signals in LTE positioning support" Motorola; Seoul, South Korea; Mar. 23-29, 2009; 8 pages.
United States Patent and Trademark Office, "Non-Final Office Action" for U.S. Appl. No. 12/973,467 dated Mar. 28, 2013, 10 pages.
United States Patent and Trademark Office, "Ex Parte Quayle Action" for U.S. Appl. No. 13/088,237 dated Dec. 19, 2012, 6 pages.
United States Patent and Trademark Office, "Non-Final Rejection" for U.S. Appl. No. 13/759,089 dated Apr. 18, 2013, 17 pages.
United States Patent and Trademark Office, "Non-Final Rejection" for U.S. Appl. No. 12/756,777 dated Apr. 19, 2013, 18 pages.

(56) References Cited

OTHER PUBLICATIONS

United States Patent and Trademark Office, "Notice of Allowance and Fee(s) Due" for U.S. Appl. No. 13/188,419 dated May 22, 2013, 9 pages.
United States Patent and Trademark Office, "Final Rejection" for U.S. Appl. No. 12/756,777 (036877) dated Nov. 1, 2013, 13 pages.
United States Patent and Trademark Office, "Non-Final Rejection" for U.S. Appl. No. 12/542,374 dated Aug. 7, 2013, 23 pages.
United States Patent and Trademark Office, "Non-Final Office Action" for U.S. Appl. No. 12/407,783 dated Sep. 9, 2013, 17 pages.
United States Patent and Trademark Office, "Non-Final Rejection" for U.S. Appl. No. 12/407,783 dated Oct. 5, 2011, 15 pages.
The State Intellectual Property Office of the People's Republic of CF-HNA, "Notification of the First Office Action" for Patent Application No. 201080025882.7 dated Feb. 8, 2014, 10 pages.
The State Intellectual Property Office of the People's Republic of China, "Notification of the First Office Action" for Patent Application No. 201080011891.0 dated Oct. 8, 2013, 6 pages.
Patent Cooperation Treaty, "PCT Search Report and Written Opinion of the International Searching Authority" for International Application No. PCT/US2010/036982 dated Nov. 22, 2010, 17 pages.
35PP TS 25.305 V8.1.0 (Dec. 2008) 3rd Generation Partnership Project; Technical Specification Group Radio Access Network; Stage 2 functional specification of User Equipment (UE) positioning in UTRAN (Release 8), 80 pages.
3GPP TSG RAN WG2 #66bis, R2-093855; "Evaluation of protocol architecture alternatives for positioning" Qualcomm Europe, et al. Jun. 29-Jul. 9, 2009, Los Angeles, CA, USA; 4 pages.
3GPP TS 36.305 V0.2.0 (May 2009) 3rd Generation Partnership Project; Technical Specification Group Radio Access Network; Evolved Universal Terrestrial Radio Access (E-UTRA); Stage 2 functional specification of User Equipment (UE) positioning in E-UTRAN (Release 9); 60pages.
3GPP TSG RAN WG1 #57, R1-091911; "Discussions on UE positioning issues" Nortel, May 4-8, 2009, San Francisco, USA; 12 pages.
3GPP TS 04.35 V8.3.0 (Jan. 2001) 3rd Generation Partnership Project; Technical Specification Group GSM EDGE Radio Access network; Location Services (LS); Broadcast network Assistance for Enhanced Observed Time ! Difference (E-OTD) and Global Positioning System (GPS) Positioning Methods (Release 1999), 36 pages.
Patent Cooperation Treaty, "PCT Search Report and Written Opinion of the International Searching Authority" for International Application No. PCT/US2010/041451 dated Oct. 25, 2010, 16 pages.
Patent Cooperation Treaty, "PCT Search Report and Written Opinion of the International Searching Authority" for International Application No. PCT/US2010/034023 dated Dec. 1, 2010; 9 pages.
U.S. Patent and Trademark Office; Non-Final Rejection; U.S. Appl. No. 12/813,221; dated Oct. 8, 2013.
USPTO Patent Application Titled "Method and Apparatus for Transmitting Positioning Reference Signals in a Wireless Communication Network" U.S. Appl. No. 12/870,148, filed Aug. 27, 2010.
USPTO Patent Application Titled "Method for Channel Quality Feedback in Wireless Communication Systems" U.S. Appl. No. 12/823,178, filed Jun. 25, 2010.
USPTO Patent Application Titled "Method for Precoding Based on Antenna Grouping" U.S. Appl. No. 12/899,211, filed Oct. 6, 2010.
USPTO Patent Application Titled "Method of Codebook Design and Precoder Feedback in Wireless Communication Systems" U.S. Appl. No. 61/374,241, filed Aug. 16, 2010.
USPTO Patent Application Titled "Method of Precoder Information Feedback in Multi-Antenna Wireless Communication Systems" U.S. Appl. No. 61/331,818, filed May 5, 2010.
USPTO Patent Application Titled "Muting Time Masks to Suppress Serving Cell Interference for Observed Time Difference of Arrival Location" U.S. Appl. No. 12/542,374, filed Aug. 17, 2009.
USPTO Patent Application Titled "Restrictions on Autonomous Muting to Enable Time Difference of Arrival Measurements" U.S. Appl. No. 61/295,678, filed Jan. 15, 2010.
USPTO Patent Application Titled "Threshold Determination in Tdoa-Based Positioning System" U.S. Appl. No. 12/712,191, filed Feb. 24, 2010.
3GPP TSG RAN WG1 #56, Athens, Greece; Feb. 9-13, 2009 "On OTDOA method for LTE Positioning" Ericsson, R1-090918, 6 pages.
3GPP TSG RANn WG4 (Radio) #20, New Jersey, USA; Nov. 12-16, 2001, UTRAN SFN-SFN observed time difference measurement & 3GPP TS 25.311 IE 10.3.7.106 "UE positioning OTDOA neighbour cell info' assistance data fields", Tdoc R4-011408, 4 pages.
Qualcomm, Europe "On OTDOA in LTE", Contribution R1-090353 to 3GPP TSG-RAN WG1 #55bis, Jan. 12-19, 2009, Ljubljana, Slovenia (8 pages).
3GPP TSG RAN1 #58;Shenzhen, P.R. China; Aug. 24-28, 2009; Motorola; Positioning Subframe Muting for OTDOA Measurements; R1-093406.
3GPP TSG RAN WG1 Meeting #56bis; Seoul, South Korea, Mar. 23-27, 2009; Ericsson; Reference Signals for Low Interference Subframes in Downlink; R1-091314.
John P. Costas, Fellow, IEEE; Proceedings of the IEEE, vol. 72, No. 8; Aug. 1984; A Study of a Class of Detection Waveforms Having a Nearly Ideal Range-Doppler Ambiguity Properties; 14 pages.
Jiann-Ching Guey; Ericsson Research; North Carolina, USA; Synchronization Signal Design for OFDM Based on Time-Frequency Hopping Patterns; 6 pages.
3GPP TSG RAN WG1 Meeting #58; Shenzhen, China; Aug. 24-28, 2009; LS on Assistance Information for OTDOA Positioning Support for LTE Rel-9; R1-093729; 3 pages.
USPTO Patent Application Titled "Autonomous Muting Indication to Enable Improved Time Difference of Arrival Measurements" U.S. Appl. No. 12/573,456, filed Oct. 5, 2009.
3GPP TS 36.211 v8.4.0 (Sep. 2008); 3rd Generation Partnership Project; Technical Specification Group Radio Access Network; Evolved Universal Terrestrial Radio Access (E-UTRA); Physical Channels and Modulation (Release 8); 78 pages.
3GPP TSG RAN#42, "Positioning Support for LTE", Dec. 2-5, 2008, pp. 1-6, Article 39, 3GPP TR 21.900, RP-080995, Athens, Greece.
3GPP TR 36.814 V9.0.0, (Mar. 2010) 3rd Generation Partnership Project; Technical Specification Group Radio Access Network; Further Advancements for E-UTRA Physical Layer Aspects (Release 9), 103 pages.
3GPP TS 36.211 V8.6.0, Technical Specification Group Radio Access Network; E-UTRA; "Physical Channels and Modulation: (Release 8)" Mar. 2009; 83 pages.
3GPP TS 36.211 V9.0.0, Technical Specification Group Radio Access Network, E-UTRA, "Physical Channels and Modulation (Release 9)" Dec. 2009, 85 pages.
3GPP TS 36.213 V9.0.0, Technical Specification Group Radio Access Network, E-UTRA, "Physical Layer Procedures (Release 9)" Dec. 2009, 79 pages.
3GPP TS 36.355 V9.0.0, Technical Specification Group Radio Access Network, E-UTRA, "LTE Positioning Protocol (LLP) (Release 9)" Dec. 2009, 102 pages.
3GPP TSG RAN WG1 #55bis; Ljubljana, Slovenia; Jan. 12-16, 2009, "Improving the hearability of LTE Positioning Service" Alcatel-Lucent, R1-090053, 5 pages.
USPTO Patent Application Titled "Indicator Shelf for Portable Electronic Device" U.S. Appl. No. 12/480,289, filed Jun. 8, 2009.
3GPP TSG RAN WG1 #56bis, Athens, Greece; Feb. 9-13, 2009; "PHY Layer Specification Impact of Positioning Improvements" Qualcomm Europe, R1-090852, 3 pages.
3GPP TSG RAN WG1 #56; Athens, Greece; Feb. 9-13, 2009, "'Best Companion' Reporting for Improved Single-Cell MU-MIMO Pairing" Alcatel-Lucent, R1-090926, 28 pages.
3GPP TSG RAN WG1 #56bis, Seoul, South Korea; Mar. 23-27, 2009, "Further details on DL OTDOA" Ericsson, R1-091312, 6 pages.

(56) References Cited

OTHER PUBLICATIONS

3GPP TSG RAN WG1 #57, Los Angeles, CA, USA; Jun. 29-Jul. 3, 2009; "On Serving Cell Muting for OTDOA Measurements" Motorola, R1-092628, 7 pages.
3GPP TSG RAN WG1 #57bis; Los Angeles, USA; Jun. 29-Jul. 3, 2009, "Feedback considerations for DL MIMO and CoMP" Qualcomm Europe; R1-092695, 6 pages.
3GPP TSG RAN WG1 #58; Shenzhen, China, Aug. 24-28, 2009, "Implicit feedback in support of downlink MU-MIMO" Texas Instruments; R1-093176, 4 pages.
3GPP TSG RAN WG1 #58; Shenzhen, China; Aug. 24-28, 2009, Motorola, "Comparison of PMI-based and SCF-based MU-MIMO" R1-093421, 5 pages.
3GPP TSG RAN WG1 #58, Shenzhen, China, Aug. 24-28, 2009, "Draft CR 36.211 Introduction of LTE Positioning", R1-093603; 5 pages.
3GPP TSG RAN WG1 #58, Shenzhen, China, Aug. 24-28, 2009, "Draft CR 36.213 Introduction of LTE Positioning", R1-093604; 3 pages.
3GPP TSG RAN WG1 #58, Shenzhen, China, Aug. 24-28, 2009, "Draft CR 36.214 Introduction of LTE Positioning", R1-093605; 6 pages.
3GPP TSG RAN WG1 #58bis, Miyazaki, Japan, Oct. 12-16, 2009, Change Request 36.213 "Clarification of PDSCH and PRS in combination for LTE positioning" Ericsson, et al., R1-094262; 4 pages.
3GPP TSG RAN WG1 #59, Jeju, South Korea, Nov. 9-13, 2009, "Introduction of LTE Positioning" Ericsson et al.; R1-094429, 5 pages.
3GPP TSG RAN WG1 #59, Jeju, South Korea, Nov. 9-13, 2009, Change Request 36.214 "Introduction of LTE Positioning" Ericsson, et al., R1-094430; 4 pages.
3GPP TSG RAN WG1 #59, Jeju, South Korea, Nov. 9-13, 2009, Change Request 36.211 "Introduction of LTE Positioning" Ericsson, R1-095027; 6 pages.
3GPP TSG RAN WG1 #60; San Francisco, USA Feb. 22-26, 2010, "Companion Subset Based PMI/CQI Feedback for LTE-A MU-MIMO" RIM; R1-101104; 8 pages.
3GPP TSG RAN WG1 #61bis; Beijing, China; Apr. 12-16, 2010; Erisson, ST-Ericsson, "Further Refinements of Feedback Framework" R1-101742, 8 pages.
3GPP TSG RAN WG1 #61bis; Dresden, Germany; Jun. 28-Jul. 2, 2010; Huawei, "Performance Evaluation of Adaptive Codebook as Enhancement of 4 Tx feedback" R1-103447, 4 pages.
3GPP TSG RAN WG1 #61bis; Dresden, Germany; Jun. 28-Jul. 2, 2010; Samsung, "A Feedback Framework Based on W2W1 for Rel. 10" R1-103664, 19 pages.
3GPP TSG RAN WG1 #61bis; Dresden, Germany; Jun. 28-Jul. 2, 2010; AT&T, "Rationale for Mandating Simulation of 4Tx Widely-Spaced Cross-Polarized Antenna Configuration for LTE-A MU-MIMO" R1-104184, 6 pages.
3GPP TSG RAN2 #70, Montreal, Canada; May 10-14, 2010, "Signalling Support for PRS Muting in OTDOA" Ericsson, ST-Ericsson; R2-103102, 2 pages.
3GPP TSG RAN3 #68, Montreal, Canada; May 10-14, 2010, "Addition of PRS Muting Configuration Information to LPPa" Ericsson, R3-101526, 7 pages.
3GPP TSG RAN WG4 #53, Jeju, South Korea, Nov. 9-13, 2009, "System Simulation Results for OTDOA" Ericsson, R4-094532; 3 pages.
Eugene Visotsky and Upamanyu Madhow; "Space-Time Transmit Precoding With Imperfect Feedback" IEEE Transactions on Information Theory, vol. 47, No. 6; Sep. 2001, pp. 2632-2639.
Patent Cooperation Treaty, "PCT Search Report and Written Opinion of the International Searching Authority" for International Application No. PCT/US2010/026579 dated Feb. 4, 2011, 11 pages.
Patent Cooperation Treaty, "PCT Search Report and Written Opinion of the International Searching Authority" for International Application No. PCT/US2011/039214 dated Sep. 14, 2011, 9 pages.
United States Patent and Trademark Office, "Non-Final Rejection" for U.S. Appl. No. 12/480,289 dated Jun. 9, 2011, 21 pages.
United States Patent and Trademark Office, "Non-Final Rejection" for U.S. Appl. No. 12/492,339 dated Aug. 19, 2011, 14 pages.
United States Patent and Trademark Office, "Non-Final Rejection" for U.S. Appl. No. 12/542,374 dated Feb. 24, 2014, 26 pages.
3GPP TSG RAN #51, R1-080017 "Sounding RS Control Signaling for Closed Loop Antenna Selection" Mitsubishi Electric, Jan. 14-18, 2008, pages.
Patent Cooperation Treaty, "PCT Search Report and Written Opinion of the International Searching Authority" for International Application No. PCT/US2011/034959 dated Aug. 16, 2011, 13 pages.
3GPP TSG RAN VVG1 #60bis R1-102380 "DL Codebook design for 8Tx precoding" LG Electronics, Beijing China, Apr. 12-16, 2010, 4 pages.
3GPP TSG RAN WG1 #60bis, R1-101859, "Development of two-stage feedback framework for Rel-10" Alcatel-Lucent Shanghai Bell, Alcatel-Lucent, Beijing, China Apr. 12-16, 2010, 6 pages.
3GPP TSG RAN WG1 #59bis, R1-100251, "Extensions to Rel-8 type CQI/PM/RI feedback using double codebook structure" Huawei, Valencia, Spain, Jan. 18-22, 2010, 4 pages.
3GPP TSG RAN2 #60bis, Tdoc R2-080420 "Text proposal on measurements" Motorola, Sevilla, Spain, Jan. 14-18, 2008, 9 pages.
3GPP TSG WG1 #48, Tdoc R1-071250 "LS on LTE measurement supporting Mobility" St Louis, USA, Feb. 12-16, 2007, 2 pages.
European Patent Office, "Extended European Search Report" for European Patent Application No. 12196319.3 dated Feb. 27, 2014, 7 pages.
Japanese Patent Office, "Notification of Reasons for Rejection" Japanese Patent Application No. 2013-125220 dated Apr. 8, 2014, 11 pages.

\* cited by examiner

INTERFERENCE CONTROL, SINR OPTIMIZATION AND SIGNALING ENHANCEMENTS TO IMPROVE THE PERFORMANCE OF OTDOA MEASUREMENTS

CROSS-REFERENCE TO RELATED APPLICATIONS

This application is a divisional of U.S. application Ser. No. 12/813,221, entitled "Interference Control, SINR Optimization and Signaling Enhancements to Improve the Performance of OTDOA Measurements," filed Jun. 10, 2010, which claims the benefit of U.S. Provisional Application No. 61/186,568, filed Jun. 12, 2009, the disclosures of which are expressly incorporated by reference herein.

FIELD OF THE DISCLOSURE

The present disclosure relates to interference control, signal quality optimization and signaling enhancements to improve the performance of observed time difference of arrival (OTDOA) measurements in wireless receivers for the purpose of assisting user position estimation in wireless networks.

BACKGROUND

Wireless communication networks are well known. Some networks are completely proprietary, while others are subject to one or more standards to allow various vendors to manufacture equipment, such as wireless terminals, for a common system. One such standards-based network is the Universal Mobile Telecommunications System (UMTS). UMTS is standardized by the Third Generation Partnership Project (3GPP), collaboration between groups of telecommunications associations to make a globally applicable third generation (3G) mobile phone system specification within the scope of the International Mobile Telecommunications-2000 project of the International Telecommunication Union (ITU). Efforts are currently underway to develop an evolved UMTS standard, which is typically referred to as UMTS Long Term Evolution (LTE) or Evolved UMTS Terrestrial Radio Access (E-UTRA).

According to Release 8 of the E-UTRA or LTE standard or specification, downlink communications from a base station (also known as an "enhanced Node-B" or simply "eNB") to a wireless terminal, or communication device, (also known as "user equipment" or "UE") utilize orthogonal frequency division multiplexing (OFDM). In OFDM, orthogonal subcarriers are modulated with a digital stream, which may include data, control information, or other information, so as to form a set of OFDM symbols. The subcarriers may be contiguous or non-contiguous, and the downlink data modulation may be performed using quadrature phase shift-keying (QPSK), 16-ary quadrature amplitude modulation (16QAM), 64-ary quadrature amplitude modulation (64QAM), or the like. The OFDM symbols are configured into a downlink sub frame for transmission from the base station. Each OFDM symbol has a time duration and is associated with a cyclic prefix (CP). A cyclic prefix is essentially a guard period between successive OFDM symbols in a sub frame. According to the E-UTRA specification, a normal cyclic prefix is about five (5) microseconds and an extended cyclic prefix is about 16.67 microseconds.

In contrast to the downlink, uplink communications from the UE to the eNB utilize single-carrier frequency division multiple access (SC-FDMA) according to the E-UTRA standard. In SC-FDMA, block transmission of QAM data symbols is performed by first discrete Fourier transform (DFT)-spreading (or precoding) followed by subcarrier mapping to a conventional OFDM modulator. The use of DFT precoding allows a moderate cubic metric/peak-to-average power ratio (PAPR) leading to reduced cost, size and power consumption of the UE power amplifier. In accordance with SC-FDMA, each subcarrier used for uplink transmission includes information for all the transmitted modulated signals, with the input data stream being spread over them. The data transmission in the uplink is controlled by the eNB, involving transmission of scheduling requests (and scheduling information) sent via downlink control channels. Scheduling grants for uplink transmissions are provided by the eNB on the downlink and include, among other things, a resource allocation (e.g., a resource block size per one millisecond (ms) interval) and an identification of the modulation to be used for the uplink transmissions. With the addition of higher order modulation and adaptive modulation and coding (AMC), large spectral efficiency is possible by scheduling users with favorable channel conditions.

E-UTRA systems also facilitate the use of multiple input and multiple output (MIMO) antenna systems on the downlink to increase capacity. As is known, and illustrated in FIG. 2, MIMO antenna systems are employed at the eNB 202 through use of multiple transmit antennas 204 and at the UE through use of multiple receive antennas. A UE may rely on a pilot or reference symbol (RS) sent from the eNB 202 for channel estimation, subsequent data demodulation, and link quality measurement for reporting. The link quality measurements for feedback may include such spatial parameters as rank indicator, or the number of data streams sent on the same resources; precoding matrix index (PMI); and coding parameters, such as a modulation and coding scheme (MCS) or a channel quality indicator (CQI). For example, if a UE determines that the link can support a rank greater than one, it may report multiple CQI values (e.g., two CQI values when rank=2). Further, the link quality measurements may be reported on a periodic or aperiodic basis, as instructed by an eNB, in one of the supported feedback modes. The reports may include wideband or subband frequency selective information of the parameters. The eNB may use the rank information, the CQI, and other parameters, such as uplink quality information, to serve the UE on the uplink and downlink channels.

As is also known, present-day cellular telephones include global positioning system (GPS) receivers to assist in locating the devices and their owners in the event of an emergency and to comply with E-911 mandates from the Federal Communication Commission (FCC). Under most circumstances, the phone's GPS receiver can receive signals from the appropriate quantity of GPS satellites and convey that information to the cellular system's infrastructure for determination of the device's location by, for example, a location server coupled to or forming part of the wireless network. However, there are some circumstances under which the GPS receiver is ineffective. For example, when a user and his or her cell phone are located within a building, the GPS receiver may not be able to receive signals from an appropriate quantity of GPS satellites to enable the location server to determine the device's position. Additionally, wireless devices in private systems are not required to meet the FCC E-911 mandates and may not include a GPS receiver. However, circumstances may arise under which determining locations of wireless devices operating in such systems may be necessary.

To compensate for possible intermittent ineffectiveness of the GPS system and to provide location-determining capabilities in private systems, many wireless systems utilize signaling and include processes through which a wireless device's location can be estimated. For example, in many systems, base stations regularly transmit positioning reference signals that are received by the wireless devices and used either to determine information based upon which an infrastructure device, such as a location server, can compute (e.g., via triangulation and/or trilateration) the wireless device's location or to determine the location of the wireless device autonomously (i.e., at the wireless device itself). When a location server is intended to compute the wireless device's location, the wireless device may determine time of arrival (TOA) or time difference of arrival (TDOA) information upon receiving the positioning reference signal and communicate the TOA or TDOA to the location server via a serving base station (i.e., a base station providing wireless communication service to the wireless device). The TOA or TDOA information is typically determined based on an internal clock of the wireless device as established by the wireless device's local oscillator in accordance with known techniques.

Work is in progress in the 3GPP wireless standards forum to provide means for positioning mechanisms that achieve parity with or even surpass the capabilities and performance currently provided for other wireless access types including GSM, WCDMA, 1×RTT and EV-DO. It is an objective of this work to include support for positioning capabilities and features in association with LTE access while ensuring backward compatibility with networks and UEs that support LTE and EPS according to Rel-8 of the 3GPP standards. The desired positioning capabilities and features include:

a positioning protocol or protocols compatible with and enabling support for both the control plane LCS solution for EPS and OMA SUPL;

UE assisted and UE based assisted Global navigation satellite system (A-GNSS);

a downlink terrestrial positioning method, analogous to E-OTD, OTDOA and AFLT, capable of operating in UE assisted and UE based modes (note that a single downlink method will be defined); and enhanced cell ID measurements coming from the UE and/or eNode B.

Possible extensions of existing mobility measurement reporting in LTE Rel-8 are proposed in support of a downlink method—such as an Observed Time Difference of Arrival or OTDOA or, shortened, OTD method. Methods are known that are UE-centric (where the UE can generate a positional fix without the delivery by the network of ancillary data) and other methods are UE-assisted (where the UE's measurements are delivered to the network or a network component such as a Location Server (LS), for combination with other data to generate a location fix).

It is possible to report a combination of target cell physical cell identity (PCID) and reference signal received power (RSRP) with the addition of UE-measured cell relative timing information to form a measurement "triplet"—i.e. PCID, RSRP, and relative cell timing with respect to some reference cell for example, the serving cell, where in the serving cell could consist of one or more non-colocated cells. Similar approaches are known to be supported in WiMAX or generic CDMA systems, including WCDMA.

The application of such techniques are known even if the network is not synchronous, including the case where the base stations comprising the network are not aligned in time but have a known mutual timing offset.

Specifically, the UE reports relative timing for both synchronous and asynchronous cells, and it is then up to the network to make any corrections for relative inter-BS (base station) timing to permit location fixing to be accomplished.

The network, or LS, can further transmit relative eNB timing to allow the UE to perform autonomous fixes (UE-centric), but this also requires the network or LS to make available to the UE, or a secure entity in the UE, specific eNB locations, which the network operator may not wish to do.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the one or more embodiments of the present invention.

DETAILED DESCRIPTION

Aside from enhancement of the basic reference signal sequence, the OTD waveform observability (i.e. SINR) using inter-cell (including inter-sector) coordination methods, such as COMP methods can also be optimized.

Figure 1:
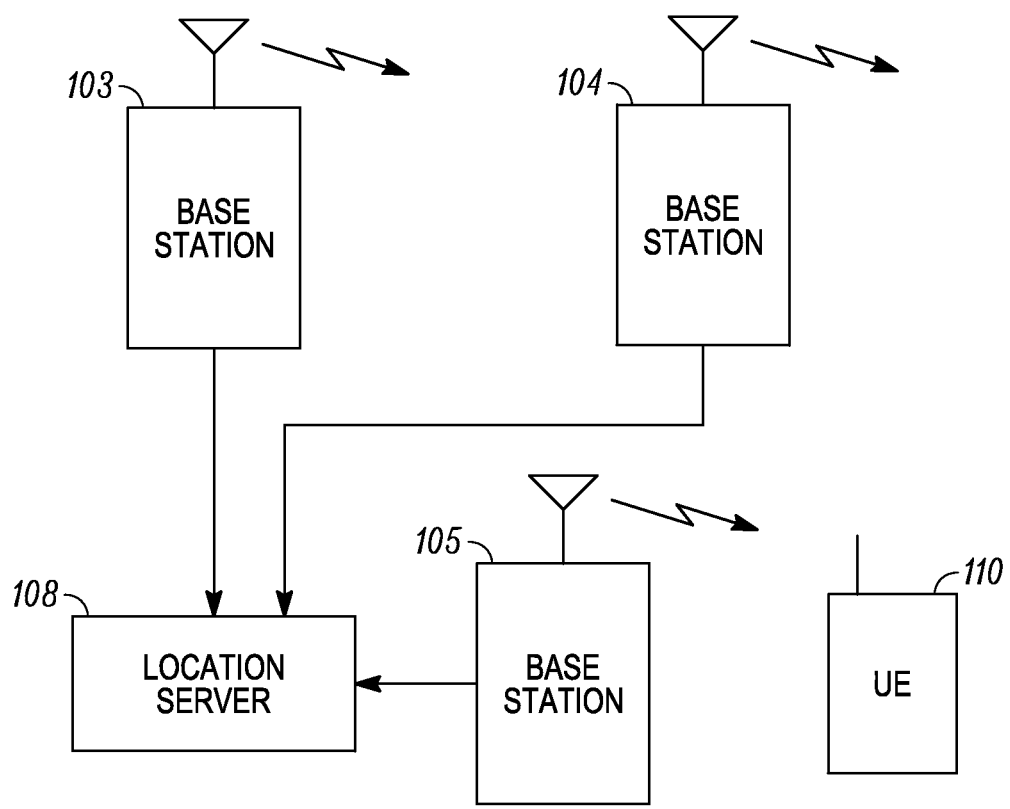
FIG. 1 is an electrical block diagram of a wireless communication system providing wireless communication service to a wireless communication device.

One embodiment disclosed herein includes a method of inter-cell, or inter-sector, enhanced observed time difference (OTD) signal transmission coordination. For example, a plurality of eNBs 103, 104, 105 (FIG. 1) transmitting enhanced OTD measurement signals may do so jointly—e.g. occupying the same, or related but jointly or co-scheduled time-frequency regions. If the identical time-frequency region is used, a single "virtual" eNB for the purposes of OTD measurements may be reported by the UE 110. Such a "virtual" eNB may employ an OTD measurement waveform, or sequence, distinct from that of the eNBs comprising the joint transmission. Such joint transmissions may preferentially be done using synchronous transmitters operating under the control of the same eNB—for example, colocated sectors of the same base station site. In this approach, the colocated sectors transmit the same waveform on overlapping time-frequency resources. In an embodiment all available PCIDs can be divided into disjoint sets S1, S2, . . . , SN, where S denotes a set of PCIDs that can be allocated to different colocated sectors (or alternatively geographically proximate sectors or cells) controlled by the same eNB. From a deployment standpoint, a PCID is a "sector ID" and the index n of Sn which is mapped to the given base station site is the "cell-site ID". The cell-site ID is then mapped to a unique waveform. If a site deployment supports remote antennas (e.g. via RF over fiber), the eNB may jointly schedule the transmission from one or more remote antennas under control of the same eNB, with at least one OTD sequence distinct from that of the parent eNB, for the purposes of OTD estimation. UEs may jointly estimate OTD to each eNB that has jointly scheduled an optimized measurement pattern. The joint transmission may be limited to only a partial subset of resource blocks (RB) on the downlink and the eNBs can flexibly schedule data to other users in the RBs not utilized in location assistance. It should also be possible to assign the RBs that are partially filled with location-pilots to a Rel.9 or Rel.10 user who can suitably rate-match data around the UE. If entire PDSCH portion is reserved for the location-assistance (via Multicast-Broadcast Single Frequency Network or MBSFN signaling or alternately, unicast signaling), then the eNB can use the physical downlink control channel (PDCCH) to send additional location-assistance information. MBSFN signaling is not preferred due to excessive overhead (24 bits, plus additional bits) in system information. In this embodiment as a method in a wireless base station includes jointly scheduling and transmitting a sequence for the purpose of OTD estimation enhancement from at least two transmitters. Further within this embodiment, the time-frequency resource jointly scheduled can be identical at each transmitter. Alternately, each transmitter may be under the control of a single eNB. Alternately, the transmitted sequence is established by one or more of the PCID, Global Cell Identifier (GCID), System Frame number (SFN), sub frame index, applicable radio network transaction identifier (RNTI) of a single cell or measurement channel.

One embodiment pertains to inter-cell OTD measurement enhancement pattern transmission. System information blocks (or SIBs) could carry augmented measurement patterns applicable to surrounding cells to permit a UE 110 to schedule OTD estimates of those cells. SIBs could be transporting (via "neighbor list" or similar list), the relationship between PCID and "pattern", or this can be specified in the 3GPP specifications. Augmented measurement patterns could be arranged according to a reuse pattern to optimize semi-static interference properties. The neighbor cell pattern information may also be determined by reading at least a part of neighbor cell system information (e.g., unused bits in the Primary Broadcast Channel (PBCH) or SIBs). The measurement pattern could be sent on a per-carrier basis. For example, the measurement pattern together with the at least one of PCID and the carrier frequency can be sent. The pattern could be signaled to include at least one of a. the offset of the sub frame(s) on which the OTDOA waveforms are transmitted (e.g. offset relative to the system frame number or SFN wrap-around point)

b. the periodicity of the OTDOA sub frame(s) (e.g. in multiples of sub frames)

c. the time-frequency resource element (RE) pattern within the OTDOA sub frame(s).

The base station signals measurement patterns to UEs in the broadcast which enables the UEs to determine the relationship between the received augmented signal and the neighbor cell that has transmitted it. With this method, the UE will be able to determine the time-frequency resources on which the OTD waveforms from the different base stations are transmitted. In this embodiment, with respect to a wireless terminal, the method includes receiving information on augmented measurement patterns corresponding to OTD signals applicable to serving cell and the neighbor cells in the broadcast signal (e.g. SIB) or radio resource configuration (RRC) message. The UE receives a neighbor cell list together with the relationship between PCID of the neighbor cell and the measurement pattern. The method may include receiving a measurement pattern specific to a carrier frequency. The method may include receiving the measurement pattern that obeys a certain time-frequency reuse pattern. The method may include receiving the measurement pattern by reading at least part of the neighbor cell broadcast (e.g. PBCH, SIBs). The method may include receiving a signaled measurement pattern from the eNB further consisting of receiving at least one of an offset relative of the OTDOA sub frame(s) relative to reference point (e.g. SFN wrap-around point), a periodicity of the OTDOA sub frame(s), time-frequency RE pattern within the OTDOA sub frame(s).

Another embodiment pertains to providing protocol support to OTDOA measurements. Layer 1/Layer 2 methods will need to support positioning protocols like SUPL 2.0. The UE 110 can list the base stations 103-105 that it can measure in some order (e.g. RSRP, RS-SINR, etc.) and can request that the network (NW) to send information about the OTDOA waveforms from the cells it can measure. The NW can send the time-frequency information corresponding to transmissions from at least a subset of the requested base-stations. With respect to a wireless terminal, this embodiment includes a method in a wireless terminal of identifying and listing base stations according to a certain ranking order (e.g. RSRP, RS-SINR). The method may include sending the neighbor cell list to an eNB for the purpose of transmitting OTDOA waveforms. With respect to a wireless base station, this embodiment includes a method in a wireless base station of receiving a report from an UE containing information on at least one base station 103, 104, 105 that the UE can see. The method may include receiving the time-frequency information corresponding to the OTDOA waveforms from one or more base stations (e.g. on the X2 or from the Location server 108). The method may further include transmitting time-frequency information corresponding to the OTDOA waveforms that the different base stations will use (on the SIB or RRC or PDCCH).

Another embodiment pertains to inter-frequency gap configuration for OTDOA measurements. Since the interference on the serving carrier frequency is a function of loading on the serving/neighbor cells, one might end up in a scenario where OTDOA measurements of serving/neighbor cells are degraded. It might be preferable to configure a UE to measure OTDOA of cells on other carriers where the loading is small. In this case, the NW can first configure a UE to detect and report RSRP, etc of cells it can see on a certain carrier frequency. The NW can then configure gap-assisted OTDOA measurements on those inter-frequency carriers. Based on the "hearability" of a cell on a particular layer which can be deduced by the NW based on RSRP/RSRQ reports from the UE, the NW can configure a particular UE to perform OTDOA measurements on a certain cell on certain carrier frequency. The SFN and sub frame timing of the OTDOA sub frame on inter-frequency carrier might be unknown to the serving cell in an asynchronous network. In that case, the UE may read the MIB of a certain cell on an inter-frequency carrier and send it to the serving cell so that it can provision gaps at the appropriate instants. Depending on the OTDOA sub frame structure and periodicity new gap patterns might have be defined in the RRC/RRM specs. For example, if all of the OTDOA waveforms are transmitted in one sub frame, a transmit gap length (TGL) equal to at least 2 ms (=1 ms signal reception+2*0.5 RF switching time) might be required. For synchronous deployments, TGL of 3 ms might be necessary as the sub frame before and after the OTDOA sub frame are impacted. Also, if the OTDOA waveform is broadcasted at a periodicity of say 240 ms, the gap periodicity should preferably be 240 ms or a multiple thereof. The gap pattern configuration and removal can be done on a per-UE basis by RRC messages. The gap pattern configuration may be implicitly deduced by the UE as part of the RRC message containing the location information sent to the UE. This embodiment with respect to a wireless terminal includes receiving an inter-frequency measurements configuration command from the NW. The method may include identifying and performing RSRP or reference signal received quality (RSRQ) measurements and triggering a report on cells on a certain configured inter-frequency carrier. The method may include detecting the SFN timing by reading MIB for the cell on the inter-frequency carrier and reported to the serving cell. The method may include receiving a command from the NW to start performing OTDOA measurements. The method may include receiving a command where the command includes information regarding the time instants where the transmission gaps from the serving cell are enabled (by for example a configuration of the OTDOA measurement gap and a subsequent removal following a timer expiry or a measurement report). With respect to a wireless base station, this embodiment may includes receiving a measurement report consisting of PCID and RSRP/RSRQ on a certain inter-frequency carrier from a UE. The method may include receiving SFN information of the detected cells from an UE. The method may include determining the time location of OTDOA sub frames corresponding to neighboring cells from at least one PCID, reported SFN, etc. The method may include configuring an OTDOA measurement gap for a UE to enable it to switch to a certain carrier frequency. The method may include stopping the measurement gap in response to a timer expiry or reception of an OTDOA measurement report from the UE.

Yet another embodiment pertains to signaling of positioning reference signal (PRS) locations in time, carrier frequency, neighbor cell list and other side information. It is generally understood that downlink OTDOA will be used for location estimation. This algorithm relies on the ability of the UE to "hear" signals from eNBs other than the serving eNB. Studies seem to indicate that the existing common reference symbols are not adequate from a hearability perspective. Thus it has been proposed by multiple companies that new positioning reference symbols (PRS) be transmitted periodically from each eNB. The PRS would be transmitted periodically on special "PRS" sub frames. It should be noted that any given eNB will transmit on only a portion of the resource elements (REs) within a sub frame. In at least one implementation, all REs other than those allocated to control symbols and PRS would be unused by the given eNB.

In a synchronous system, the PRS transmissions are synchronized between all eNBs. This has several advantages, including:
1. The UE can hear other eNBs during the PRS sub frame within any RE that the eNB is not using to transmit control or PRS signals. Thus, over at least of part of the PRS sub frame, the serving eNB is muted. In these REs, interference is greatly reduced and the UE can more easily hear the other eNBs.
2. The search effort for the UE is greatly reduced. The UE need only search the PRS sub frames for PRS sequences (which are located within the PRS sub frame).

In an asynchronous system, the sub frames are not synchronized and thus it follows that the PRS sub frames are not synchronized. In general, no timing relationship can be assumed between the PRS sub frames transmitted from different eNBs. In such a case, it is no longer possible for the eNB to enable the UE to better hear all other eNBs by self-muting a single sub frame (though if the serving eNB has knowledge of when the neighboring eNBs are sending PRS sub frames, it is possible for the eNB to mute to allow the UE to hear PRS transmissions from selected neighbors). Thus, in an asynchronous system, hearability is degraded unless the serving eNB mutes during the PRS sub frame transmissions of each of the neighboring eNBs.

Additionally, since the PRS sub frames on the non-serving eNBs are not synchronized to those of the serving eNB, the UE does not know where to look for the PRS sub frames, and it would then be necessary for the UE to continuously scan for PRS sequences. In this case, the problem is actually more complex than SCH detection. For SCH detection, the UE can be guaranteed that an SCH transmission lies within any 6 consecutive subframes. Thus, the UE can scan for the SCH in a non real-time fashion by buffering 6 msec of samples. As PRS sub frames might only be sent once every 100 sub frames, it would be necessary for the UE to grab 101 msec of samples to implement non real-time scanning for the PRS sequences.

Finally, it should be noted that for location purposes, the UE must detect signals from neighboring eNBs at signal levels lower than those required for RRM cell search detection via the synch channel. Thus, the set of neighboring eNBs (and the corresponding timing) discovered by the UE via RRM cell search are not sufficient to identify the eNBs which should be measured for location purposes.

In summary, in an asynchronous system in which the PRS sub frames are not synchronized:
  i) The UE does not know where to search for the PRS sequences, as it does not know the location of the PRS sub frame.
  ii) The UE does not know which PRS eNBs are in the vicinity and thus does not know which PRS sequences to search for.

Without some sort of assistance from the serving eNB, the detection of PRS is much more complex and difficult and computationally complex than detection of the SCH.

Note further, that blind detection of PRS sequences in a very large search space will perform quite poorly. Blind detection of each PRS sequence will require that each PRS sequence be correlated with all possible timing hypotheses over 100 msec—for a bandwidth of 10 MHz, the required number of correlations per PRS sequence would exceed 1.5 million. For blind detection, we would generally take the timing corresponding to the maximum of these correlations. However, for a weak signal, the maximum of a large number of correlations in the absence of the desired signal will generally exceed correlation with the desired signal present, and thus, the timing estimate will be incorrect. In order to limit complexity and improve performance, it is necessary to limit the scope of the search space. In order to do this, we propose following.

Upon initiation of a location request from the UE or from another source, the eNB should:
  i) signal to the UE the indices of the (pre-defined) PRS sequences for which the UE should search; and ii) signal to the UE the location (timing information) of the PRS sub frame corresponding to each PRS sequence.

This information can also be broadcast periodically in a SIB message.

In an asynchronous system, the PRS sub frame of each neighboring cell will partially overlap two of the sub frames of the serving eNB (else, the two eNBs are synchronous). Thus the eNB would signal the UE with the index of the first sub frame (of the serving cell) with which the next PRS sub frame of the neighboring cell will overlap. The UE would then search over a 2 msec time interval beginning with the start of the sub frame index for the PRS sequence of the neighboring cell. In this way, the search interval is reduced from 101 msec to 2 msec.

The resolution of the timing information available to the serving eNB with respect to the timing of the PRS sub frame of the neighboring eNB may be much less than the 1 msec subframe duration. In this case, the eNB can further reduce the mobile search space for the neighboring PRS sub frame by providing more precise timing information to the UE. In particular, the eNB could signal the mobile with both the sub frame index and the symbol index for the first sub frame/symbol with which the next PRS subframe overlaps. In this case, the UE would search this symbol and the next consecutive N symbols for the PRS sequence, where N is the number of symbols per sub frame. Alternatively, eNB can send this timing information to the UE with full resolution to minimize the PRS sequence search interval for the UE.

The periodicity of the PRS sub frames may be configurable by the network. If so, the periodicity should be included in the SIB broadcast. In general, not all networks may choose the same periodicity for the PRS sub frame. Furthermore, not all eNBs may use the same periodicity. Depending on the network loading, the eNB may choose to broadcast the PRS sub frames either more or less frequently. In one such implementation, we may define a shortest time interval T for periodic transmission of the PRS signals. Rather than use this shortest time interval, some networks and/or eNBs within the network may use an integer multiple of this base time interval T for periodic transmission of the PRS. However, in this case, the transmission time should be defined such that in a synchronous network, any eNBs using the same multiple N of the base transmission interval T are be time aligned in order to both simplify the search for the PRS and improve the hearability of the PRS. If the PRS information is signaled on a SIB, the SIB should include the frequency layers on which PRS sub frames are transmitted.

In some instances, the network may only support PRS transmissions on some frequency layers and not on others so as to minimize the associated overhead. Alternatively, it may be that there are not enough "hearable" eNBs on one frequency layer for the UE to get a sufficient number of TOA measurements to get a reliable location estimate. In such instances, it will be necessary for the network to signal the frequency layer to the UE in addition to index and timing of the PRS transmission. If the frequency layer on which the PRS is transmitted is different from the serving cell carrier, the serving cell needs to configure an OTDOA measurement gap. The serving cell should not schedule DL and/or UL data to enable the UE to shift its RF to the target frequency layer and perform measurements. In such a scenario, the eNB should signal the timing of this gap to the UE (e.g. SFN index/sub frame index/symbol index corresponding to the start of the gap, gap duration, etc.).

In order to improve hearability, the PRS sequences may vary periodically with respect to either the set of resource elements that are assigned or the sequence of values assigned to these REs. If so, the UE specific signaling or the MIB message should provide sufficient information to indicate the current state of the PRS sequence for the given eNB. For example, if the PRS transmission shifts periodically between N values, an index should be provided giving the state of the PRS at the time of next transmission.

Some aspects related to signaling are as follows:
1. The OTDOA measurements will likely be performed on a PRS sub frame or over a low-interference sub frame (e.g. over CRS with serving cell muting) in LTE Rel-9, while in UTRA, the measurements are performed on CPICH (FDD) or another signaled channel (TDD) when the serving provides an IPDL gap (i.e., set of slots where the serving cell is muting transmission).
2. Three deployment scenarios are possible. In this application, the term "OTDOA sub frame" is used to indicate a sub frame that the UE uses for OTDOA measurement, irrespective of whether it contains a PRS transmission or just a CRS transmission with serving cell muting).
    a) Synchronous—for this all of the OTDOA sub frames are aligned and the SFN numbers of the different cells may or may not be aligned. The UE needs to look for PRS within a small search window of the serving cell PRS transmission (e.g. search window size or SWS=3*CP~15 us for normal CP—the UE can find OTDOA sub frames from the listed neighbors within +/−SWS of the serving cell OTDOA sub frame).
    b) Partially-aligned—for this case the OTDOA sub frames have a partial overlap (e.g. 500 us). The UE needs to look for PRS transmission from neighbors within say, one sub frame of the serving cell PRS sub frame (e.g. search window=1 sub frame). Even for this case, the SFN numbers of serving and neighbor cells may or may not be aligned. For this case, more than one sub frame may be used for PRS transmission (e.g. 2 or more consecutive sub frames with specific PRS patterns may be transmitted) so that the overlap of OTDOA sub frames is at least 1 ms between all transmitting base stations. Also, transmission from a certain base station may be muted (e.g. serving cell) for 2 or more consecutive sub-frames. It may be possible to use a combination of the two—mute a certain subset of base stations for 2 or more consecutive sub frames while a different subset of base stations transmit OTDOA sub frames for 2 or more consecutive sub frames.
    c) Asynchronous—for this case the OTDOA sub frames may not have any overlap. For this case, the SFN numbers are not aligned. For this case, the search window size can be set to maximum periodicity of OTDOA sub frame transmission (e.g. If the maximum OTDOA sub frame transmission periodicity is 320 ms, setting search window size=320 us will allow a UE to find all neighbors within +/−SWS of the serving cell OTDOA sub frame). Further assistance can be provided to the UE by signaling a coarse timing offset of the nearest OTDOA sub frame of the neighbor cell relative to the serving cell. Alternately, for the asynchronous case, it might be that specially designed PRS transmissions may have no benefit over using CRS+serving cell muting. For this case, it would be useful to signal the sub frame offset of the neighbor cells relative to serving cell and an associated timing uncertainty to aid UE processing. The CRS transmission has a 10 ms periodicity and knowing the sub frame timing offset within a radio frame would help UE restrict its correlation size of the CRS template corresponding to the muted sub frame(s) occasion from the serving cell. For example, the length of the CRS template can be set to 1 ms+timing uncertainty associated with the neighbor's sub frame timing instead of correlating the 1 ms received signal with a 10 ms template. This assistance signaling reduces complexity and improves performance.

To cover all the potential cases, signaling should include the following.

i. Serving eNBs signals the deployment scenario (for example, synchronous, partially-aligned or asynchronous) directly or via a search window size (for example, SWS=3*CP for synchronous, SWS=0.5 ms or 1 ms for partially aligned, and SWS=large for asynchronous).
  ii. Serving eNB signals the list of PCIDs or site IDs for which OTDOA sub frames can be found within the search window corresponding to all neighbors.
  iii. Serving eNB signals the SFN-SFN difference between itself and neighbor cells (alternately, the serving eNB could just transmit a "seed" delta corresponding to state of the PRS transmission from a neighbor cell).
  iv. Serving cell signals the frequency information associated with the neighbor cell. Different frequency layers might have different neighbor cell lists and only a subset of all possible frequency layers may be used for OTDOA sub frame transmission.
  v. For the asynchronous case, the serving eNB can provide a coarse OTDOA sub frame timing for neighbors relative to itself in place of a signaling search window size.
  vi. For the asynchronous case, the serving eNB can signal the occasion of the serving cell muting. The UE looks for all neighbors in the muted subframe(s). The assistance data can include the set of PCIDs and in addition, can include the sub frame offsets of neighbors (since CRS transmission repeats once every 10 ms) relative to serving eNB and an associated timing uncertainty to help UE processing.

Another embodiment with respect to a wireless terminal can include receiving signaling information pertaining to reference signal transmission on specifically designated sub frame(s) (also referred to OTDOA sub frames) that have a repetition pattern in time (e.g. one/two sub frame(s) every N=320 sub frames is(are) designated as the OTDOA sub frame(s)) for serving base station and the neighbor base stations that includes a list of PCIDs or site IDs for the base station 103, 104, 105. The method may include receiving frequency layer information corresponding to the serving and neighbor base stations. The method may include further receiving a minimum measurement bandwidth associated with reference signal transmission for the purpose of OTDOA measurements applicable to all neighbor cells. The method may include further receiving deployment type information pertaining to whether the OTDOA sub frame transmissions from serving and neighbors are aligned, partially aligned or asynchronous via a direct indication or via a UE search window size. The method may include receiving system timing of neighbor cells relative to serving cell—this can be SFN-SFN timing difference and/or state-state difference of PRS transmission for each neighbor relative to serving. The method may include receiving an indication to use CRS for OTDOA measurements and information pertaining to muted sub frame(s) from the serving cell (e.g. SFN+sub frame number) over which the UE is expected to perform neighbor cell OTDOA measurements; of further receiving subframe-subframe timing difference for neighbors relative to serving. The method may include determining the time-frequency resources associated with reference signal transmission intended for OTDOA measurements. The method may further include measuring time of arrival of transmission from the base station relative to reference timing.

Another embodiment pertains to exchanging PRS timing information between eNBs. The serving eNB can discover the timing of the PRS sub frames of its neighbors using the S1 or X2 interfaces (e.g. SFN number and sub frame index of the neighbors relative to its own timing). If both the serving eNB and the neighboring eNB have GPS then they can exchange the GPS system times corresponding to the transmission of their respective PRS sub frames. In instances in which the serving and/or neighboring eNB do not have access to GPS system time, other methods must be used to report this timing offset. In one such method, the serving eNB would request that the neighboring eNB provide the time interval until it transmits its next PRS sub frame, and in response, the neighboring eNB would report this time interval. In order to interpret this information, the serving eNB would need to know the round trip delay between itself and the neighboring eNB for the S1 or X2 interface. This delay can be calibrated using protocols such as those identified in IEEE 1588. Based on the system timing information of a second base station, a first base station then schedules the transmission of OTDOA reference signals using the timing information, where the transmission is scheduled such that the transmission of OTDOA reference signals from the first and second base stations substantially overlap in time and the OTDOA reference signals from the first and second base station being substantially different. The reference signal comprises a sequence of symbols transmitted over a set of time-frequency resources. If either the sequence used or the time-frequency resources used for transmission of the reference signal are different between the two base stations, the reference signals are different.

This embodiment accounts for the possibility that PRS transmissions in LTE Rel-9 may be fully aligned or partially aligned. Establishing timing between base stations will likely be done via GNSS (GNSS)/GPS and/or inter-base station communication over X2. Specifically for LTE, the timing of the OTDOA sub frames and the associated state of the pseudo-random number generators (e.g. SFN number) associated with those transmission would be a useful quantities to signal to the UE to assist UE processing. This embodiment can include a wireless base station of exchanging the OTDOA sub frame transmission timing information with a second base station over S1 or X2 interface where the timing information may be the reference system times (e.g. GNSS, GPS) corresponding to the OTDOA sub frames. The timing information may be the SFN-SFN difference associated transmissions from the two cells or specifically just the state-state difference corresponding to PRS transmissions from the two cells. The timing information may correspond to the time to next PRS transmission from the signaling instant. The method may further involve exchanging other side information including the periodicity of PRS transmission, timing information related to a third base station, etc.

Figure 5:
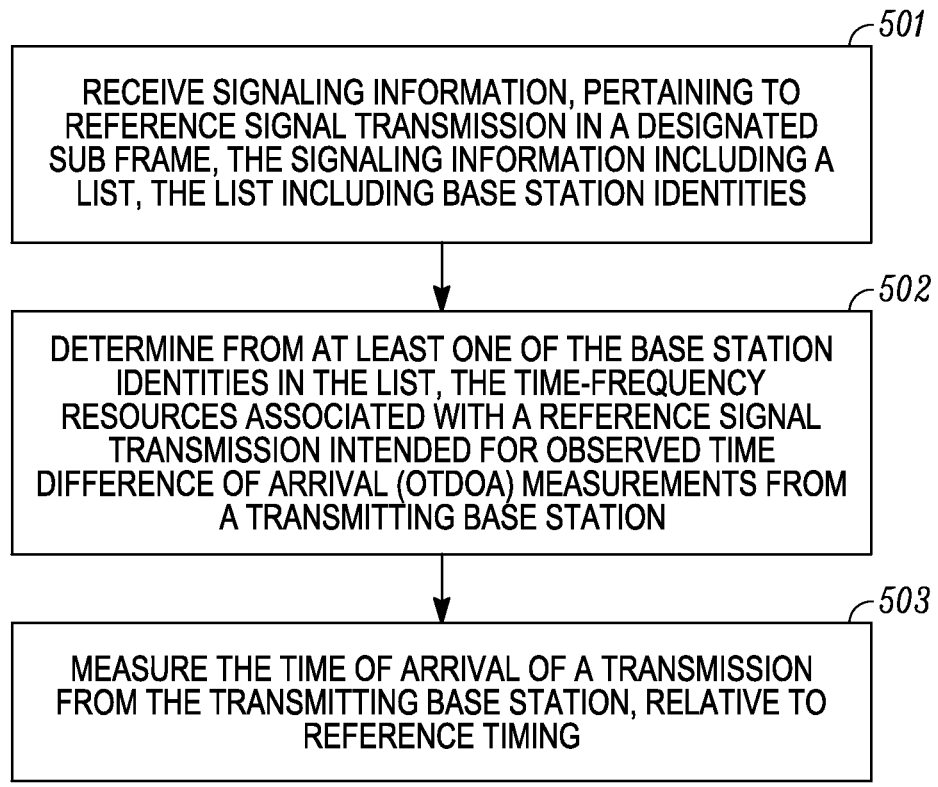
FIG. 5 is a logic flow diagram of steps executed by a wireless communication device to process a downlink sub frame.

Accordingly, it can be seen that a wireless terminal (UE 110, FIG. 1) receives signaling information, pertaining to a reference signal transmission in at least one specifically designated sub frame, the signaling information including a list, the list including base station identities as set forth in step 501 of FIG. 5. The wireless terminal determines, from at least one of the base station identities in the list, the time-frequency resources associated with a reference signal transmission intended for observed time difference of arrival (OTDOA) measurements from a transmitting base station associated with said one base station identity in block 502. The time of arrival of a transmission from the transmitting base station, relative to reference timing, is measured in step 503. This novel operation of the present invention can be performed under the control of a program executing in the processor in UE 110, such as the processor illustrated in the wireless terminal of FIG. 2.

Figure 6:
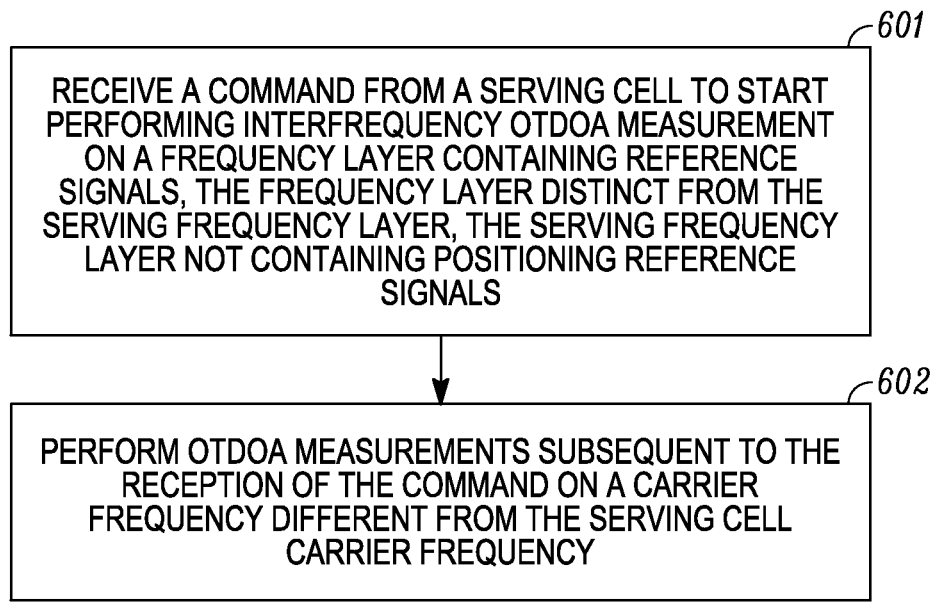
FIG. 6 is a logic flow diagram of steps executed by a wireless communication device to process a downlink sub frame.

According to another embodiment, the wireless terminal (UE 110, FIG. 1) receives a command from a serving cell (base station 103, 104 or 105) to start performing interfrequency OTDOA measurement on a frequency layer containing reference signals, the frequency layer distinct from the serving frequency layer, the serving frequency layer not containing positioning reference signals as indicates in step 601 in FIG. 6. The wireless terminal 110 can perform OTDOA measurements subsequent to the reception of the command on a carrier frequency different from the serving cell carrier frequency in step 602. This novel operation of the present invention can be performed under the control of a program executing in the processor in UE 110, such as the processor illustrated in the wireless terminal of FIG. 2.

Figure 2:
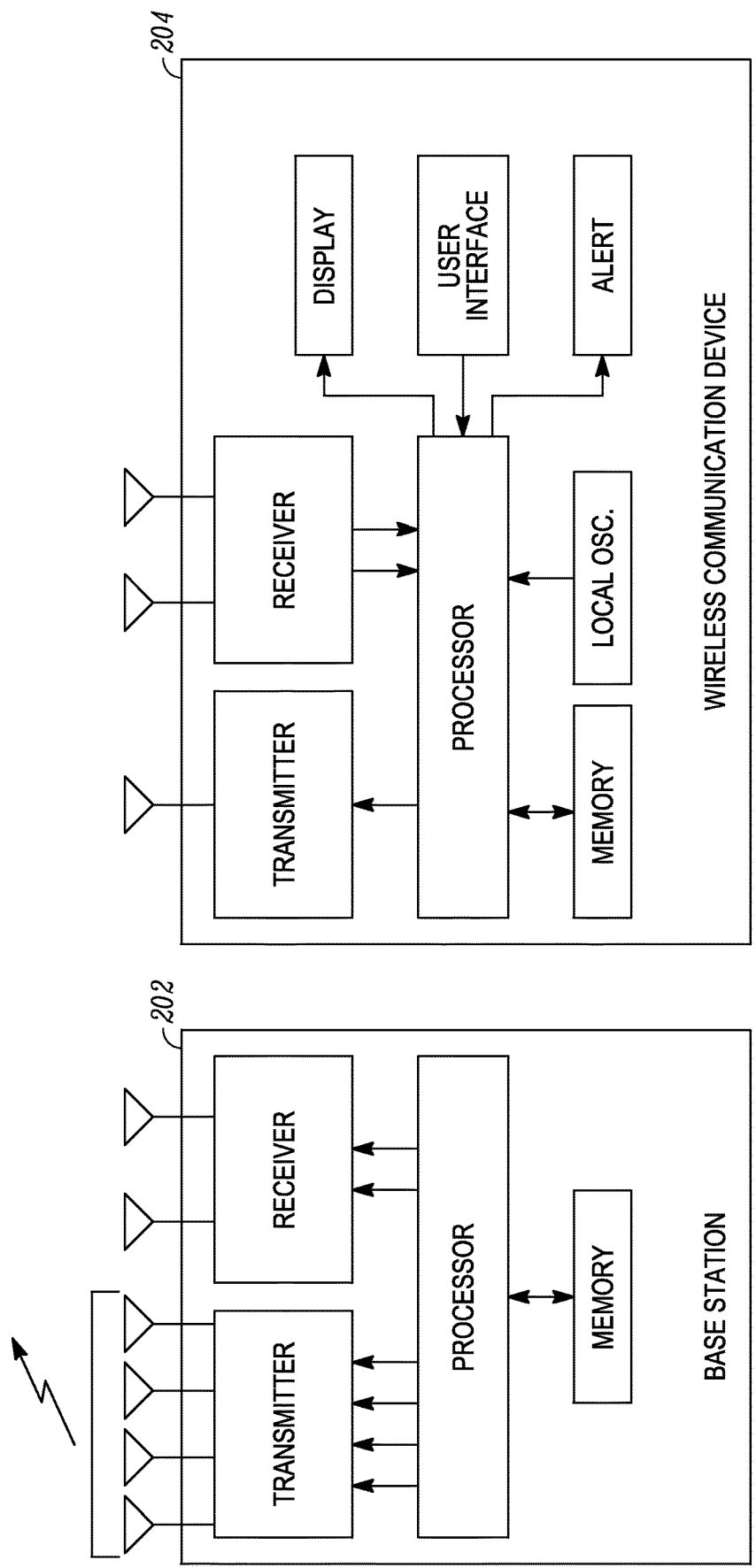
FIG. 2 illustrates electrical block diagrams of an exemplary base station usable in the wireless communication system of FIG. 2 and a wireless communication device.
Figure 3:
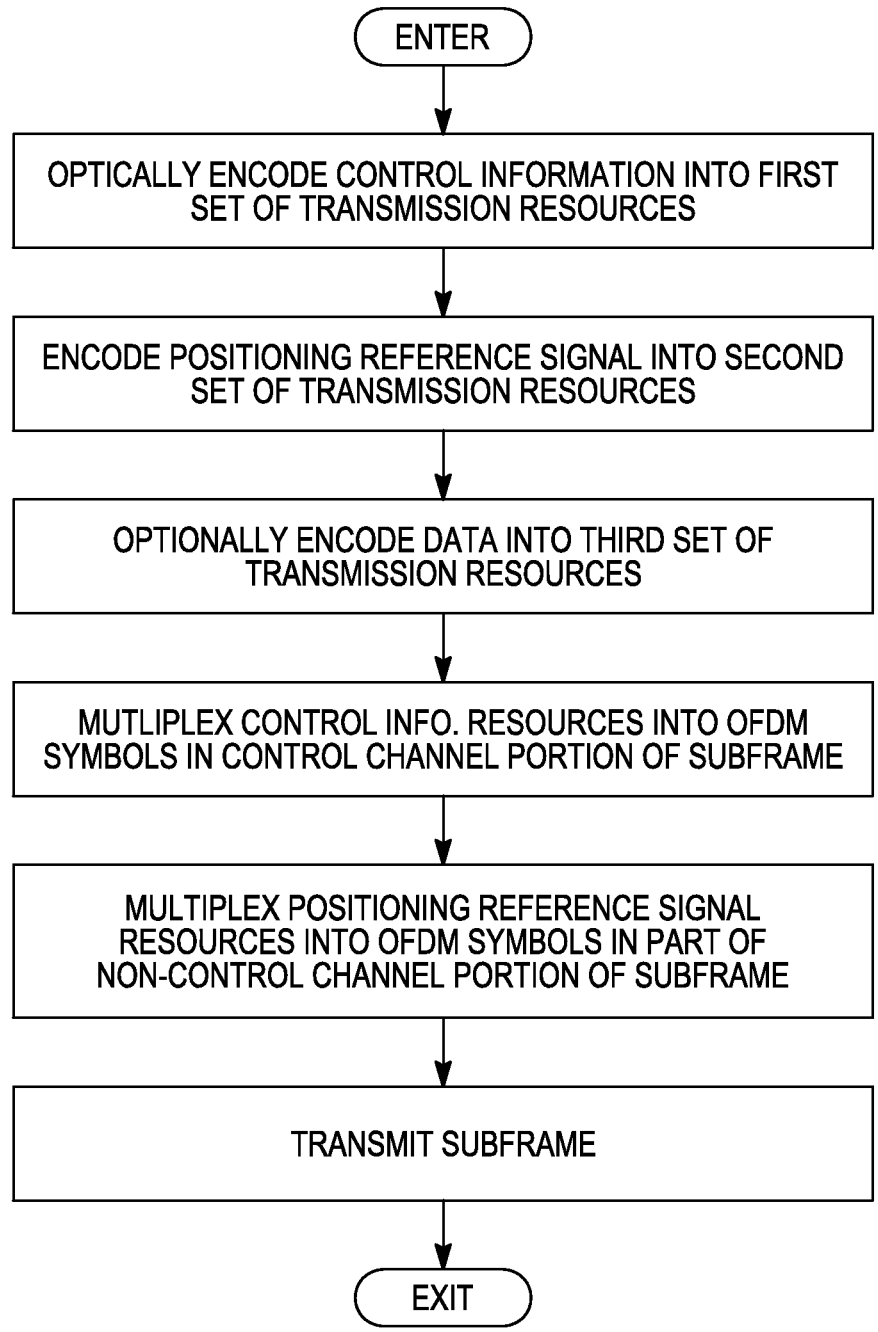
FIG. 3 is a logic flow diagram of steps executed by a base station to generate a downlink sub frame for transmission of a positioning reference signal to a wireless communication device.
Figure 4:
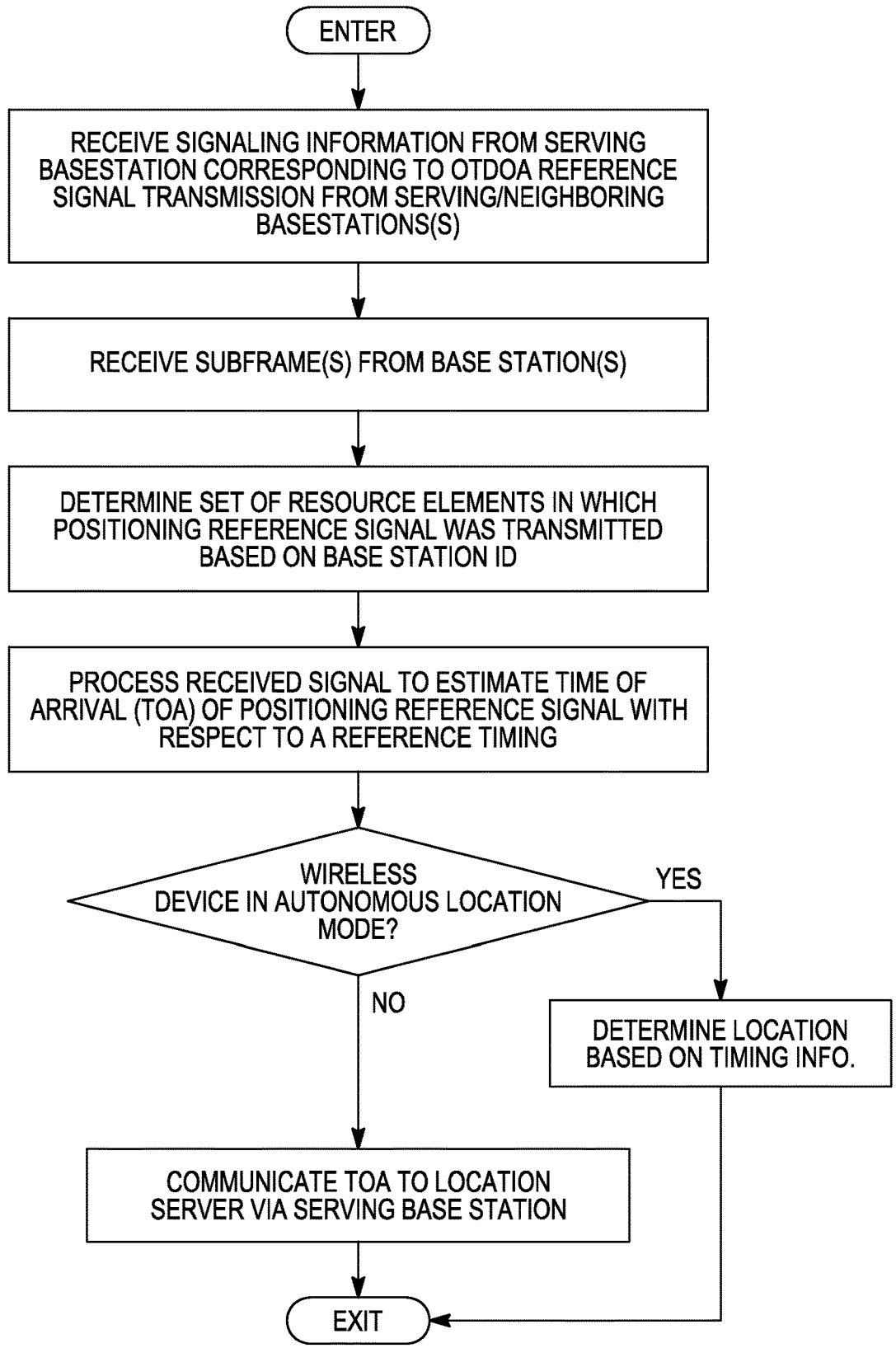
FIG. 4 is a logic flow diagram of steps executed by a wireless communication device to process a downlink sub frame containing a positioning reference signal.
Figure 7:
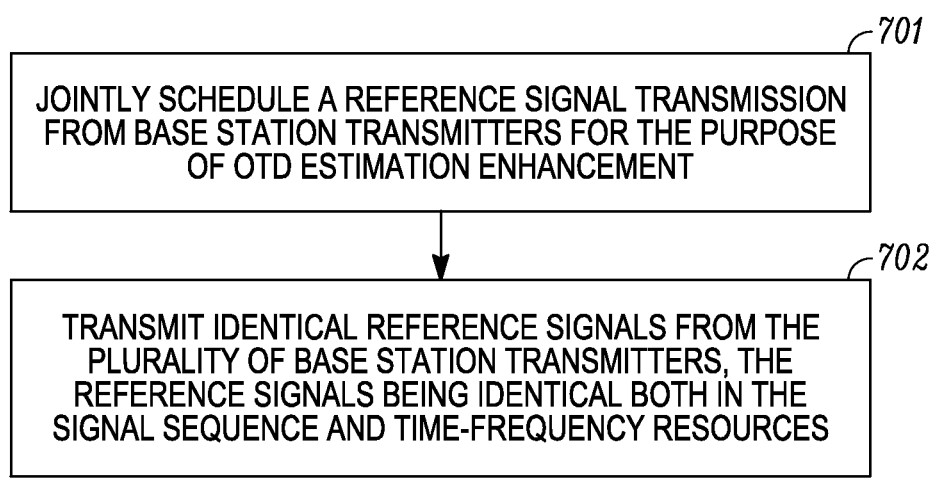
FIG. 7 is a logic flow diagram of steps executed by a base station to generate a downlink sub frame for transmission to a wireless communication device

According to yet another embodiment, a base station transmitter (an example of a transmitter is illustrated in FIG. 2) can jointly schedule a reference signal transmission from a plurality of base station transmitters (in base stations 103-105) for the purpose of OTD estimation enhancement as indicated in step 701 in FIG. 7. The base stations 103-105 can transmit identical reference signals from the plurality of base station transmitters, the reference signals being identical both in the signal sequence and time-frequency resources used for transmission. This novel operation of the present invention can be performed under the control of a program executing in a processor in each of the base station such as those illustrated in the base stations 103, 104, 105 of FIGS. 1 and 2.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may utilize one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be appreciated that some embodiments may utilize one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method in a first base station including:
   receiving, by the first base station, system timing information of a second base station;
   transmitting, to the second base station, system timing information of the first base station;
   scheduling, by the first base station, transmission of observed time difference of arrival (OTDOA) reference signals using the system timing information of the first base station and the system timing information received from the second base station, the transmission being scheduled such that the transmission of OTDOA reference signals from the first and second base stations overlap in time, and the OTDOA reference signals from the first and second base stations being different; and
   signaling, to a wireless terminal, a measurement pattern corresponding to the OTDOA reference signals from the first and second base stations, wherein the measurement pattern includes an offset of subframes on which the OTDOA reference signals are transmitted.

2. The method of claim 1, wherein the system timing information of the first and second base stations includes reference system times corresponding to OTDOA subframes.

3. The method of claim 1, wherein the signaling the measurement pattern to the wireless terminal is based on the system timing information of the first and second base stations.

4. The method of claim 1, wherein the signaling the measurement pattern includes signaling a relationship between the measurement pattern and the second base station identity to the wireless terminal.

5. The method of claim 1, wherein the measurement pattern includes a periodicity of OTDOA subframes.

6. The method of claim 1, wherein receiving the system timing information of the second base station includes reading at least a portion of a broadcast by the second base station, the broadcast including at least one of a primary broadcast channel and a system information block.

7. The method of claim 1, wherein receiving the system timing information of the second base station includes requesting from the second base station a time interval until a next transmission of an OTDOA reference signal from the second base station.

8. The method of claim 1, wherein the system timing information of the first and second base stations is exchanged over at least one of an S1 interface and an X2 interface.

* * * * *